United States Patent [19]

Schuppiser et al.

[11] 4,439,574
[45] Mar. 27, 1984

[54] PROCESS FOR THE PREPARATION OF LATICES OF VINYLACETATE/OLEFIN COPOLYMERS

[75] Inventors: Jean-Luc Schuppiser, Claye Souilly; Jean-Claude Daniel, Fontenay-sous-Bois, both of France

[73] Assignee: Rhone-Poulenc Specialites Chimiques, France

[21] Appl. No.: 405,425

[22] Filed: Aug. 5, 1982

[30] Foreign Application Priority Data

Aug. 10, 1981 [FR] France ................... 81 15437

[51] Int. Cl.$^3$ .................... C08F 2/16; C08F 2/24
[52] U.S. Cl. ........................ 524/458; 526/201
[58] Field of Search .............. 524/458; 526/201

[56] References Cited

U.S. PATENT DOCUMENTS 3,547,845 12/1970 Pinkney ....................... 260/17
3,779,960 12/1973 Yoshihiko et al. ............ 260/8
4,244,845 1/1981 Woo ............................ 260/17 R

FOREIGN PATENT DOCUMENTS 1180133 10/1964 Fed. Rep. of Germany .
1139202 1/1969 United Kingdom .

*Primary Examiner*—Paul R. Michl
*Assistant Examiner*—Alex H. Walker
*Attorney, Agent, or Firm*—Finnegan, Henderson, Farabow, Garrett & Dunner

[57] ABSTRACT

Process for the preparation of latices of vinyl acetate/olefin copolymers. Vinyl acetate is copolymerized with at least one olefin and, if desired, at least one other copolymerizable monomer, in aqueous emulsion, in the presence of an initiator, an emulsifier and a protective colloid comprising a water-soluble polymer (a) containing at least one monomer of acrylamide, methacrylamide or substituted or unsubstituted N-alkyl derivatives of acrylamide or methacrylamide and a water-soluble polymer (b) of ethylene glycol having a molecular weight between 1,000 and 50,000. The latices may be applied as binders in the manufacture of paints, glues, paper, textiles, floor coverings and mortar additives.

14 Claims, No Drawings

PROCESS FOR THE PREPARATION OF LATICES OF VINYLACETATE/OLEFIN COPOLYMERS

The invention relates to a process for the preparation of latices of vinyl acetate/olefin copolymers and also to the copolymer latices obtained by the process.

Latices of vinyl acetate/olefin copolymers are generally used as binders in the manufacture of glues, paints, textiles, paper and the like. They are prepared by the polymerization of vinyl acetate and an olefin in emulsion, in the presence of such protective colloids as cellulose ethers, polyvinyl alcohols or polyvinylpyrrolidone. These protective colloids advantageously impart to the latices good stability during both storage and handling, as well as the viscosity required for latex applications, but disadvantageously impart to the copolymer films a sensitivity to water.

The process of the present invention produces latices of vinyl acetate/olefin copolymers which possess good stability during both storage and handling and suitable viscosity for applications. The latices also yield copolymer films having a very good resistance to water.

The process of the present invention comprises copolymerizing vinyl acetate with at least one olefin and, if appropriate, at least one other copolymerizable monomer, in aqueous emulsion, in the presence of an initiator, an emulsifier and a protective colloid. The protective colloid comprises a water-soluble polymer (a) containing at least one monomer selected from the group consisting of acrylamide, methacrylamide, substituted or unsubstituted N-alkyl derivatives of acrylamide and substituted or unsubstituted N-alkyl derivatives of methacrylamide, and a water-soluble polymer (b) of ethylene glycol, the polymer (b) having a molecular weight between 1,000 and 50,000.

The water-soluble amide polymer (a), which is the first constituent of the protective colloid, may be a homopolymer, or a copolymer in all proportions, or a mixture of at least one homopolymer and/or at least one copolymer of the monomers acrylamide, methacrylamide, and N-alkyl derivatives of acrylamide or methacrylamide, in which the alkyl group possesses 1 to 4 carbon atoms and may be substituted by amine or hydroxyl groups or alkoxy groups possessing 1 to 4 carbon atoms. Preferred amide monomers include acrylamide, methacrylamide, N-methylacrylamide, N,N-dimethylacrylamide, N-isopropylacrylamide, N-methylaminoisopropylacrylamide, N-methylolacrylamide, N-methylolmethacrylamide, N-methoxymethylacrylamide and N-isobutoxymethylacrylamide.

The water-soluble amide polymer (a) may be prepared, for example, by the polymerization of at least one of the above-mentioned amide monomers at a concentration of 0.1 to 7% by weight, in aqueous solution, in the presence of a water-soluble free-radical initiator and/or ultraviolet rays, at a temperature between 0° and 90° C.

A suitable initiator for forming amide polymer (a) may be selected from the conventional water-soluble free-radical initiators for polymerization in solution, such as hydrogen peroxide, alkali metal persulfates, water-soluble diazo derivatives, or redox systems based on oxidizing agents, such as hydrogen peroxide, organic peroxides and hydroperoxides and reducing agents such as alkali metal sulfites and bisulfites, amines, hydrazine, metal formaldehydesulfoxylates and the like. All these initiators are used by themselves or in a mixture, in amounts of 0.1 to 10% by weight of the amide monomer(s).

The water-soluble amide polymer (a) may be cross-linked by amounts, ranging up to 50% by weight of the amide monomer(s), of water-soluble crosslinking agents including N,N'-$C_1$-$C_4$-alkylidene-bis-($C_3$-$C_5$-unsaturated acid amides), such as N,N'-methylene-bis-(acrylamide) and N,N'-methylene-bis-(methacrylamide), diallyl ether, diallyl sulfosuccinate and polyallyloxyethane.

The polymer (b) of ethylene glycol, which is the second consituent of the protective colloid, is water-soluble and possesses a molecular weight between 1,000 and 50,000, preferably, between 3,000 and 35,000. The polymer (b) may comprise homopolymers of ethylene glycol and mixtures of at least two homopolymers of different molecular weight. These polymers are products which are well-known and commercially available.

In the polymerization process of the invention, the protective colloid comprises 15 to 70% by weight of the amide polymer (a) and 30 to 85% by weight of the polymer of ethylene glycol (b) and is used in an amount of 0.1 to 5%, preferably, 0.5 to 3%, by weight of the monomers to be copolymerized to form the vinyl acetate/olefin copolymers.

The two constituents of the protective colloid are used in the form of aqueous solutions.

The solution of the amide polymer (a) may be used at any time after its preparation, but, according to a preferred form of the invention, is used immediately after its preparation.

The solutions of amide polymer (a) and the solution of ethylene glycol polymer (b) may be introduced separately into the medium for polymerization in emulsion. Alternatively, the polymer of ethylene glycol (b) may be dissolved in the solution of amide polymer (a). Alternatively, in a preferred form of the invention, the polymer of ethylene glycol (b) is added to the solution of amide monomer(s) before polymerization of the amide polymer (a) occurs. The solutions are introduced either all at once before polymerization, or in successive portions or continuously during polymerization.

In the aqueous solution(s) of the two constituents of the protective colloid, the amide polymer (a) plus the polymer of ethylene glycol (b) represent from 0.1 to 15% by weight of the water.

The olefins which can be copolymerized with the vinyl acetate by the new process preferably possess 2 to 4 carbon atoms, such as ethylene, propylene and butenes.

The other copolymerizable monomers which may be used include the vinyl esters of branched or unbranched, saturated monocarboxylic acids having from 1 to 12 carbon atoms, such as vinyl propionate, "Versatate" (registered trademark for mixtures of vinyl esters of branched $C_9$-$C_{11}$ acids), vinyl pivalate and vinyl laurate, and/or the alkyl esters of unsaturated monocarboxylic or dicarboxylic acids possessing 3 to 6 carbon atoms, in which the alkyl moiety possesses 1 to 10 carbon atoms, such as methyl, ethyl, butyl and ethylhexyl acrylates, methacrylates, maleates and fumarates. Vinyl and vinylidene halides, such as vinyl chloride and vinylidene chloride may also be used.

These other copolymerizable monomers may either be polymerized with the vinyl acetate and at least one olefin or may be grafted onto the vinyl acetate/olefin copolymer.

The olefins and other comonomers are used in amounts such that the glass transition temperature of the copolymer obtained is between −30° and 50° C., preferably, between −20° and 35° C.

Depending on the process, the monomers for copolymerization are introduced into the polymerization medium, under pressure if the monomer is gaseous, either in total before polymerization or in successive portions or continuously during polymerization, or in part before polymerization, the other part being introduced in successive portions or continuously during polymerization.

Depending on the polymer to be obtained, it is possible to add a crosslinking monomer and/or a transfer agent to the monomers.

Representative crosslinking monomers, which may be used in proportions between 0 and 10%, preferably, between 0 and 3%, by weight, relative to the monomers to be copolymerized, include vinyl acrylate and methacrylate, divinyl ether, mono- or poly(alkylene($C_2$-$C_4$) glycol) acrylates and methacrylates, allyl phthalate, triallyl cyanurate, tetraallyloxyethane, alkali metal diallyl-sulfosuccinates, and condensates of unsaturated carboxylic acids ($C_3$-$C_5$) with polyols, such as, for example, trimethylolpropane acrylate and methacrylate.

Representative transfer agents, which may be used in proportions between 0 and 10%, preferably, between 0 and 3%, by weight, relative to the monomers to be copolymerized, include halogenohydrocarbons, such as methylene chloride, chloroform, carbon tetrachloride, bromoform, carbon tetrabromide, dichloroethane and trichloroethane; aliphatic alchols having 1 to 4 carbon atoms, such as methyl alcohol and allyl alcohol; and, preferably, mercaptans, such as laurylmercaptan, dodecylmercaptan and aminophenylmercaptan.

The crosslinking monomer and/or the transfer agent are introduced by themselves or in a mixture, in any known manner, before or during polymerization, for example, at the same time as the monomers to be copolymerized or at the same time as one of the monomers, either simultaneously or, more particularly, in solution in one of the monomers or in solution in the mixture of monomers.

The concentration of monomers to be copolymerized in the polymerization medium is advantageously between 10 and 70% by weight.

A suitable initiator for effective copolymerization is selected from conventional water-soluble initiators for polymerization in emulsion, such as hydrogen peroxide, alkali metal persulfates, water-soluble diazo derivatives, or redox systems based on oxidizing agents such as hydrogen peroxide, organic peroxides and hydroperoxides and reducing agents such as alkali metal sulfites and bisulfites, amines, hydrazine, and metal formaldehydesulfoxylates. The initiator is used in proportions of the order of 0.05 to 4.5%, preferably, 0.1 to 2%, by weight of the monomers to be copolymerized. It is introduced into the polymerization medium in total before polymerization or in successive portions or continuously during polymerization, or in part before polymerization, the other part being added in successive portions or continuously during polymerization, especially if the life of the initiator at the polymerization temperature is short.

To ensure the stability of the reaction medium and of the latex to be obtained, one or more emulsifiers may be present in the reaction medium. These emulsifiers may be anionic and/or non-ionic and are conventional products for polymerization in emulsion.

Representative anionic emulsifiers include salts of fatty acids; alkali metal alkylsulfates, alkylsulfonates, alkylarylsulfonates, alkylsulfosuccinates and alkylphosphates; sulfonates of alkylphenol polyglycol ethers; salts of alkylsulfopolycarboxylic acid esters; condensation products of fatty acids with oxyalkanesulfonic and aminoalkanesulfonic acids; sulfated derivatives of polyglycol ethers; sulfated fatty acid esters of polyglycols; and sulfated fatty acid alkanolamides.

Representative non-ionic emulsifiers include fatty acid esters of polyalcohols, fatty acid alkanolamides, ethylene oxide/propylene oxide copolymers, oxyethyleneated alcohols and alkylphenols, and sulfated oxyethyleneated alcohols and alkylphenols.

The amounts of emulsifier(s) to be used are of the order of 0.1 to 3% by weight, relative to the monomers to be copolymerized, and their introduction into the reaction medium may be carried out either in total before polymerization, or in part before polymerization, the complementary part being added to the reaction medium in successive portions or continuously during polymerization, or, in total in successive fractions or continuously during polymerization, depending on the average particle diameter of the latex to be obtained. According to a particular embodiment of the invention, the emulsifier is added to the medium for the preparation of the amide polymer (a), this being the first constituent of the protective colloid.

Depending on the nature of the monomers used, and to prevent hydrolysis of the copolymer, it may be advantageous to maintain the polymerization medium at a pH between 3 and 7. This can be achieved by adding a pH regulator to the medium. Representative pH regulators include a base, such as sodium hydroxide or ammonia, and/or a buffer, such as sodium acetate, sodium bicarbonate or borax. The regulator is added to the medium, by itself or in a mixture, in total or in part before polymerization, the complementary part being added in successive portions or continuously during polymerization, or in total in successive portions or continuously during polymerization. More particularly, the regulator is added to the medium for the preparation of the amide polymer (a), this being the first constituent of the protective colloid.

The polymerization temperature, which is a function of the initiator used and the copolymer to be obtained, is generally between 0° and 95° C., preferably, between 20° and 90° C.

According to a variant, the process described above is carried out in the presence of a seed polymer to ensure better control over the particle size of the latex to be obtained. This seed polymer may be identical to or different from the polymer to be obtained. The seed polymer is obtained by the polymerization, in aqueous emulsion, of vinyl acetate, or of vinyl acetate and an olefin, and/or of at least one of the comonomers listed above. The latex of seed polymer obtained is added to the polymerization medium at the same time as one of the constituents of the protective colloid, or at the same time as the mixture of these two constituents, or is prepared in the presence of one or both of the constituents of the protective colloid.

Depending on the intended application of the latex, it is possible to add a plasticizer, before, during or after polymerization, in proportions between 0 and 20%, preferably between 0 and 10%, by weight, relative to the copolymer. This plasticizer, which is used by itself or in a mixture, is chosen from amongst the conventional plasticizers and coalescence agents for polyvinyl acetate, such as halogenated or unhalogenated alkyl($C_4$–$C_6$) phthalates, including dibutyl, diethyl, and trichloroethyl phthalates, ethylene glycol phthalate, adipate and dibenzoate, butylcarbitol acetate, butyl glycolate, glycerol triacetin, dipropyl or diisobutyl succinates, glutarates and adipates, and tricresyl and triphenyl phosphates.

The latices of vinyl acetate/olefin copolymers obtained possess a concentration of 10 to 70%, preferably 35 to 65%, by weight of particles of copolymers having a glass transition temperature between −30° and 50° C. The narrow or broad size distribution of the particles is between 0.05 and 1 μm. The latices have a viscosity ranging from a few mPa.s, such as 50 mPa.s, to 80,000 mPa.s, preferably 50 to 30,000 mPa.s, and give films having a very good resistance to water.

The latices are used as binders in the manufacture of paints, glues, paper, textiles, particularly nonwoven textiles, floor coverings and mortar additives.

Examples of embodiments of the invention are given below by way of illustration other than by way of limitation. In these examples, the percentages are by weight; the viscosity of the latex is measured at 20° C. using a Brookfield RVT viscometer at a speed of 50 rpm; the particle diameter is measured by electron microscopy; the glass transition temperature of the copolymer (Tg) is measured by differential calorimetric analysis; the water resistance is determined by placing a drop of demineralized water on a 300 μm film obtained by depositing the latex on a transparent glass plate, this being followed by drying for 2 hours at 50° C. and then for 24 hours at ambient temperature. The water resistance is expressed as the time required for the film to become opaque at the location of the drop of water.

EXAMPLE 1

Preparation of the protective colloid

The following are introduced into a reactor fitted with a condenser, a nitrogen inlet and a stirrer:

1,050 g of deionized water;
13.5 g of acrylamide;
1 g of N,N′-methylene-bis-(acrylamide);
0.5 g of sodium acetate;
71 g of a 26.5% strength aqueous solution of sodium tetradecylsulfonate;
19 g of polyethylene glycol of molecular weight 6,000.

The air is removed by introduction of a stream of nitrogen. While the stream of nitrogen is maintained, the mixture is stirred. After dissolution, the solution is heated to 60° C.

As soon as the solution has reached 60° C., a solution of 0.7 g of ammonium persulfate in 50 cm³ of water is introduced, and the solution is kept at 60° C. for 1 hour. The stream of nitrogen is then stopped.

Polymerization

All air and nitrogen in the reactor are evacuated by drawing a vacuum, and a solution of 5 g of potassium persulfate in 50 cm³ of water is then added to the colloid solution obtained. A mixture of 1,520 g of vinyl acetate and 190 g of "Versatate VEOVA 10" (registred trademark) is then introduced continuously at a constant rate over 3 hours.

"Versatate VEOVA 10" is a mixture of vinyl esters of branched $C_9$ to $C_{11}$ monocarboxylic acids.

15 minutes after the start of the introduction of the monomer mixture, the following are carried out simultaneously:

the introduction of 190 g of isobutene at a constant rate over 1 hour;
heating the reaction mixture to and maintaining the mixture at 80° C.;
the introduction of 19 g of potassium persulfate in 200 cm³ of water, at a constant rate over 2 hours 45 minutes.

Two hours after the isobutene and potassium persulfate have been completely introduced, the reaction mixture is cooled.

A latex of an 80/10/10 vinyl acetate/isobutene/"Versatate VEOVA 10" terpolymer is obtained, which has the following characteristics:

| | |
|---|---|
| pH | 2.8 |
| viscosity | 1,280 mPa · s |
| concentration | 49.8% |
| particle diameter | 0.1–0.4 μm |
| Tg of the polymer | 18° C. |
| water resistance | 15 minutes |

By way of comparison, an 80/10/10 vinyl acetate/isobutene/"Versatate" terpolymer prepared by polymerization in emulsion in the presence of hydroxyethylcellulose, in proportions equal to those of the protective colloid of Example 1, possesses a water resistance of only 2 minutes.

EXAMPLE 2

Preparation of the protective colloid

The following are introduced into a reactor fitted with a stirrer:

1,000 g of deionized water;
19 g of acrylamide;
5.5 g of sodium acetate;
19 g of sodium tetradecylsulfonate;
19 g of polyethylene glycol of molecular weight 10,000.

The air is removed by inroduction of a stream of nitrogen. The stream of nitrogen is maintained and the mixture is stirred. After dissolution, the reaction mixture is heated to 60° C. and this temperature is maintained. As soon as the mixture has reached 60° C., a solution of 0.8 g of ammonium persulfate in 100 cm³ of water is introduced into the reactor. After a reaction time of 1 hour, the stream of nitrogen and the stirring are stopped.

Polymerization

After all the air and nitrogen in the reactor have been evacuated by drawing a vacuum, ethylene is introduced until a pressure of 13 bars has been reached in the reactor, this pressure being kept constant throughout the polymerization by adding ethylene.

A solution of 2 g of ammonium persulfate in 100 cm³ of water are added to the stirred mixture, and 1,700 g of vinyl acetate are then added continuously at a constant rate over 10 hours. 20 minutes after the start of this introduction of vinyl acetate, the reaction mixture is heated to 70° C. and kept at this temperature whilst a solution of 5.7 g of ammonium persulfate in 400 cm³ of water is introduced at a constant rate over 10 hours.

Two hours after the introduction of the ammonium persulfate solution has ended, the mixture is cooled. The pressure in the reactor is 2 bars.

After degassing, a latex of an 88/12 vinyl acetate-/ethylene copolymer is obtained, which has the following characteristics:

| | |
|---|---|
| pH | 2.8 |
| viscosity | 700 mPa · s |
| concentration | 52% |
| particle diameter | 0.1–0.4 μm |
| Tg | 5° C. |

EXAMPLE 3

Preparation of the protective colloid

The following are introduced into a reactor fitted with a stirrer:
1,000 g of deionized water;
14.5 g of acrylamide;
5.5 g of sodium acetate;
19 g of sodium tetradecylsulfonate;
19 g of polyethylene glycol of molecular weight 10,000.

The air is removed by introduction of a stream of nitrogen. The stream of nitrogen is maintained and the mixture is stirred. After dissolution, the reaction mixture is heated to 60° C., this temperature being maintained. As soon as the mixture has reached 60° C., a solution of 0.8 g of ammonium persulfate in 100 cm³ of water is introduced into the reactor. After a reaction time of 1 hour, the stream of nitrogen and the stirring are stopped.

Polymerization

After all air and nitrogen in the reactor have been evacuated by drawing a vacuum, ethylene is introduced until a pressure of 13 bars has been reached in the reactor. This pressure is kept constant throughout the polymerization by adding ethylene.

A solution of 2 g of ammonium persulfate in 100 cm³ of water is added to the stirred mixture, and 1,387 g of vinyl acetate are then added continuously at a constant rate over 10 hours. 20 minutes after the start of this introduction of vinyl acetate, the reaction mixture is heated to 70° C. and kept at this temperature while the following are introduced simultaneously and continuously:

285 g of vinyl chloride at a constant rate over 9 hours 40 minutes;

a solution of 5.7 g of ammonium persulfate in 400 cm³ of water, at a constant rate over 10 hours.

Two hours after the vinyl chloride and ammonium persulfate solution have been completely introduced, the mixture is cooled. The pressure in the reactor is 3.5 bars.

After degassing, a latex of a 73/12/15 vinyl acetate/ethylene/vinyl chloride terpolymer is obtained, which has the following characteristics:

| | |
|---|---|
| pH | 2.6 |
| viscosity | 500 mPa · s |
| concentration | 51.3% |
| particle diameter | 0.1–0.4 μm |
| Tg | 17° C. |

EXAMPLE 4

Preparation of the protective colloid

The following are introduced into a reactor fitted with a condenser, a nitrogen inlet and a stirrer:
5,890 g of deionized water;
107 g of acrylamide;
43 g of sodium acetate;
488 g of a 29.5% strength solution of sodium tetradecylsulfonate;
144 g of polyethylene glycol of molecular weight 10,000.

The air is removed by introduction of a stream of nitrogen. The stream of nitrogen is maintained during the preparation of the colloid. The mixture is stirred.

After dissolution, the solution is heated to 60° C., and this temperature is maintained.

As soon as the solution has reached 60° C., 6 g of ammonium persulfate in 20 cm³ of water are introduced.

After a reaction time of 1 hour, the stream of nitrogen is stopped.

Preparation of a seed 3.5 g of ammonium persulfate and 144 g of vinyl acetate are added to the colloid solution.

After 20 minutes, the reaction medium is heated to 80° C., kept at this temperature for 1 hour and then cooled to ambient temperature.

Polymerization

The following are introduced successively into a reactor which has been evacuated by drawing a vacuum:
800 g of the seed obtained above;
800 g of deionized water.

The mixture is stirred, heated to and maintained at 80° C. throughout the reaction.

As soon as the mixture has reached 80° C., a solution of 5 g of potassium persulfate in 50 cm³ of water is added thereto. The following are then introduced simultaneously, continuously and at a constant rate:

197 g of isobutene over 1 hour;

19 g of potassium persulfate in 200 cm³ of water, over 2 hours 45 minutes;

a mixture of 1,506 g of vinyl acetate and 197 g of "Versatate VEOVA 10", over 3 hours.

Two hours after the isobutene, potassium persulfate solution and vinyl acetate-"Versatate VEOVA 10" monomer mixture have been completely introduced, the reaction mixture is cooled.

A latex of an 80/10/10 vinyl acetate/isobutene/"Versatate" terpolymer is obtained, which has the following characteristics:

| | |
|---|---|
| pH | 2.7 |
| viscosity | 1,080 mPa · s |
| concentration | 52.8% |
| particle diameter | 0.1–0.4 μm |
| Tg of the copolymer | 18° C. |
| water resistance | 15 minutes. |

What is claimed is:

1. A process for the preparation of a latex of a vinyl acetate/olefin copolymer comprising the step of copolymerizing vinyl acetate with at least one olefin in aqueous emulsion, in the presence of an initiator, an emulsifier and a protective colloid, said protective colloid comprising a water-soluble polymer (a) containing at least one monomer selected from the group consisting of acrylamide, methacrylamide, substituted or unsubstituted N-alkyl derivatives of acrylamide, and substituted or unsubstituted N-alkyl derivatives of methacrylamide, and a water-soluble polymer (b) of ethylene glycol, said polymer (b) having a molecular weight between 1,000 and 50,000.

2. The process of claim 1, wherein said vinyl acetate and said at least one olefin are copolymerized with at least one other copolymerizable monomer and wherein said water-soluble polymer (a) is selected from the group consisting of (a) at least one homopolymer containing a monomer selected from the group consisting of acrylamide, methacrylamide, N-alkyl ($C_1$-$C_4$) derivatives of acrylamide which are unsubstituted or substituted by amine, hydroxyl or alkoxy ($C_1$-$C_4$) groups and N-alkyl ($C_1$-$C_4$) derivatives of methylacrylamide which are unsubstituted or substituted by amine, hydroxyl or alkoxy ($C_1$-$C_4$) groups, (b) at least one copolymer containing at least two monomers selected from the group consisting of acrylamide, methacrylamide, N-alkyl ($C_1$-$C_4$) derivatives of acrylamide which are unsubstituted or substituted by amine, hydroxyl or alkoxy ($C_1$-$C_4$) groups and N-alkyl ($C_1$-$C_4$) derivatives of methacrylamide which are unsubstituted or substituted by amine, hydroxyl or alkoxy ($C_1$-$C_4$) groups and (c) mixtures thereof.

3. The process of claim 2, wherein said water-soluble polymer (a) is obtained by the polymerization of at least one of said amide monomers at a concentration of 0.1 to 7% by weight, in aqueous solution, at a temperature of 0° to 90° C. in the presence of an initiator selected from the group consisting of a water-soluble free-radical initiator, ultraviolet rays and a combination thereof.

4. The process of any one of claims 1 to 3, wherein said water-soluble polymer (a) is crosslinked by a water-soluble crosslinking agent.

5. The process of claim 1, wherein the polymer (b) of ethylene glycol is a homopolymer of ethylene glycol or a mixture of homopolymers of ethylene glycol.

6. The process of claim 1, wherein, in the protective colloid, said water-soluble polymer (a) represents 15 to 70% by weight protective colloid and said polymer (b) of ethylene glycol represents 30 to 85% by weight protective colloid.

7. The process of claim 1, wherein the protective colloid is used in an amount of 0.1 to 5% by weight of the monomers to be copolymerized.

8. The process of claim 1, wherein said olefin possesses 2 to 4 carbon atoms.

9. The process of claim 2, wherein said at least one other copolymerizable monomer is selected from the group consisting of vinyl esters of branched or unbranched monocarboxylic acids ($C_1$-$C_{12}$), alkyl ($C_1$-$C_{10}$) esters of unsaturated monocarboxylic or dicarboxylic acids ($C_3$-$C_6$), vinyl halides and vinlidene halides.

10. The process of claim 1, wherein the amount of olefin is such that the copolymer obtained possesses a glass transition temperature between $-30°$ and $50°$ C.

11. The process of claim 2, wherein the amount of olefin and other copolymerizable monomer is such that the copolymer obtained possesses a glass transition temperature between $-30°$ and $50°$ C.

12. The process of claim 1, wherein the monomers are copolymerized in the presence of 0.1 to 3% by weight, relative to the monomers, of an emulsifier selected from the group consisting of anionic, non-ionic and a combination thereof.

13. The process of claim 1 or 2, wherein a seed polymer is present in the polymerization medium said seed polymer being identical to or different from said copolymer to be obtained.

14. A latex of vinyl acetate/olefin copolymer obtained in accordance with the process of claim 1, said latex containing particles of copolymer, said particles being present in said latex in a concentration of 10 to 70% by weight and having a size distribution between 0.05 and 1 μm, said copolymer having a glass transition temperature between $-30°$ and $50°$ C., and said latex having a viscosity between about 50 mPa.s and 80,000 mPa.s.

* * * * *